US009688117B2

(12) United States Patent
Stander et al.

(10) Patent No.: US 9,688,117 B2
(45) Date of Patent: Jun. 27, 2017

(54) EXTENDABLE FLEX DOOR FOR EVAPORATOR DIVISION

(71) Applicant: DENSO International America, Inc., Southfield, MI (US)

(72) Inventors: James Stander, West Bloomfield, MI (US); David Korenchuk, Royal Oak, MI (US); Kosuke Hayashi, Novi, MI (US); William Cochran, Troy, MI (US)

(73) Assignee: Denso International America, Inc., Southfield, MI (US)

( * ) Notice: Subject to any disclaimer, the term of this patent is extended or adjusted under 35 U.S.C. 154(b) by 529 days.

(21) Appl. No.: 14/219,582

(22) Filed: Mar. 19, 2014

(65) Prior Publication Data

US 2014/0287669 A1    Sep. 25, 2014

Related U.S. Application Data

(60) Provisional application No. 61/804,308, filed on Mar. 22, 2013.

(51) Int. Cl.
 *B60H 1/24*    (2006.01)
 *B60H 1/34*    (2006.01)
 *B60H 1/00*    (2006.01)

(52) U.S. Cl.
 CPC ....... *B60H 1/3414* (2013.01); *B60H 1/00678* (2013.01); *B60H 2001/00721* (2013.01)

(58) Field of Classification Search
 CPC ............. B60H 1/3414; B60H 1/00678; B60H 1/00664
 USPC ................................................ 454/156, 159
 See application file for complete search history.

(56) References Cited

U.S. PATENT DOCUMENTS

| 5,162,020 A * | 11/1992 | Asano ............... F24F 11/027 165/103 |
| 2006/0144582 A1* | 7/2006 | Sekiya ............... B60H 1/00692 165/202 |
| 2006/0145108 A1* | 7/2006 | Heshmati ........... B60H 1/00671 251/64 |

(Continued)

FOREIGN PATENT DOCUMENTS

| EP | 0449205 A1 | 10/1991 |
| JP | 61-89116 | 5/1991 |
| JP | H03281423 A | 12/1991 |

(Continued)

OTHER PUBLICATIONS

Translation of JP11115458.*

*Primary Examiner* — Steven B McAllister
*Assistant Examiner* — Martha Becton
(74) *Attorney, Agent, or Firm* — Harness & Dickey & Pierce, P.L.C.

(57) ABSTRACT

An HVAC airflow door assembly including a pivot hub, a main body, and a flexible member. The pivot hub is connectable with a pivot member for pivoting the door assembly. The main body extends from the pivot hub and includes a distal end opposite to and spaced apart from the pivot hub. The flexible member is mounted to, and extends from, the distal end of the main body, and is configured for connection with a guide track. The door assembly is configured for rotation by the pivot member between a first position in which the flexible member is collapsed, and a second position in which the flexible member is extended relative to the first position.

19 Claims, 4 Drawing Sheets

(56) References Cited

U.S. PATENT DOCUMENTS

2007/0190927 A1* 8/2007 Bash .................... F24F 13/105
　　　　　　　　　　　　　　　　　　　454/327

FOREIGN PATENT DOCUMENTS

| JP | H11115458 A | 4/1999 |
|---|---|---|
| JP | 2008273329 A | 11/2008 |
| JP | 2010120440 A | 6/2010 |

* cited by examiner

EXTENDABLE FLEX DOOR FOR EVAPORATOR DIVISION

CROSS-REFERENCE TO RELATED APPLICATIONS

This application claims the benefit of U.S. Provisional Application No. 61/804,308 filed on Mar. 22, 2013, the entire disclosure of which is incorporated herein by reference.

FIELD

The present disclosure relates to an extendable flex door for evaporator division.

BACKGROUND

This section provides background information related to the present disclosure, which is not necessarily prior art.

Figure 1:
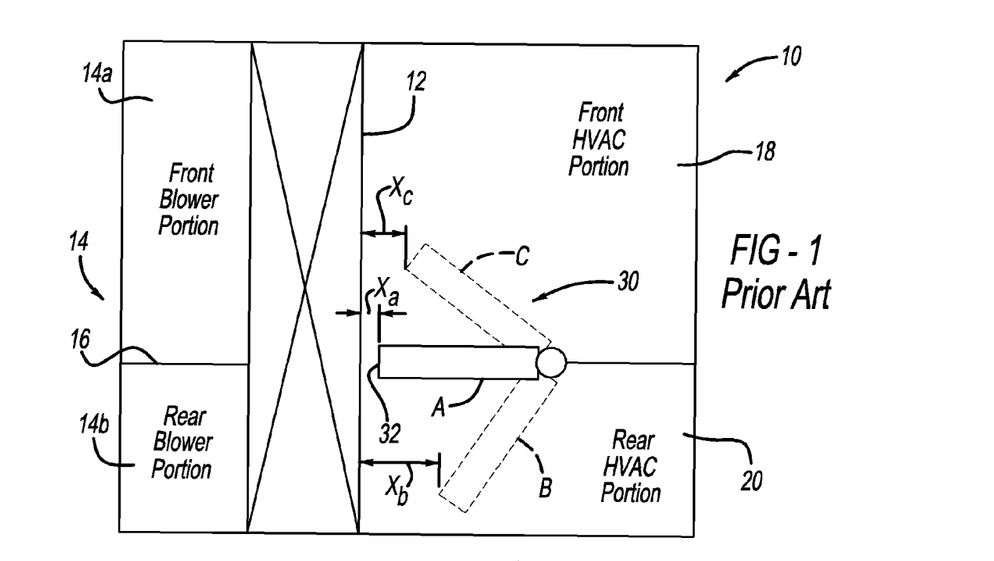
FIG. 1 is a schematic of a prior art HVAC assembly.

With reference to prior art FIG. 1, a heating, ventilation, and air conditioning (HVAC) assembly 10 is illustrated. The HVAC assembly 10 generally includes an evaporator 12 and a blower 14 including a front blower portion 14a and a rear blower portion 14b. The front and rear blower portions 14a and 14b are separated by a separator 16, such as a separator plate. The front and rear blower portions 14a and 14b generate airflow, which passes through the evaporator 12 and to a front HVAC portion 18 and/or a rear HVAC portion 20 generally depending on a position of an airflow directional door 30. The front HVAC portion 18 includes portions of the HVAC assembly 10 that provide airflow to a front portion of a vehicle in which the HVAC assembly 10 is installed. The rear HVAC portion 20 includes portions of the HVAC assembly 10 configured to provide airflow to a rear of the vehicle in which the HVAC assembly 10 is installed.

The door 30 is on a side of the evaporator 12 opposite to the blower 14. The door 30 includes a distal end 32, which is spaced apart from the evaporator 12 at any suitable distance to permit rotation of the door 30 without contacting the evaporator 12. The door 30 is configured to move between a first position A, a second position B, and a third position C. The first position A is generally intermediate to the second and the third positions B and C. In the first position A the door 30 is generally aligned with the separator plate 16. The door 30 can be moved to any suitable position between the second and the third positions B and C.

In the first position A, the door 30 extends generally perpendicular to the evaporator 12, and defines a gap or space $X_a$ between the distal end 32 of the door 30 and the evaporator 12. The gap $X_a$ may be any suitable size. For example, the gap $X_a$ may be 5 mm. In the first position A, airflow generated by the front blower portion 14a passing through the evaporator 12 is generally entirely directed to the front HVAC portion 18 by the door 30, and airflow generated by the rear blower portion 14b passing through the evaporator 12 is generally entirely directed to the rear HVAC portion 20 by the door 30. Only a negligible amount of airflow passes, if any, from the front blower portion 14a across the distal end 32 of the door 30 to the rear HVAC portion 20. Likewise, only a negligible amount of airflow, if any, passes from the rear blower portion 14b across the distal end 32 of the door 30 to the front HVAC portion 18. The first position A is typically referred to as a normal position.

From the first position A the door 30 can rotate to the second position B or the third position C, or any position therebetween. The second position B is generally a front bias position. In the second position B, airflow from the front blower portion 14a is generally entirely directed to the front HVAC portion 18, and most, but not all, airflow from the rear blower portion 14b is also directed to the front HVAC portion 18. Due to a gap or space $X_b$ between the distal end 32 and the evaporator 12, however, some airflow from the rear blower portion 14b will flow around the door 30 to the rear HVAC portion 20. In some instances, the gap $X_b$ can be as large as 15 millimeters. Because the gap $X_b$ is larger than the gap $X_a$, a pressure differential may be created between the front and rear HVAC portions 18 and 20, which may further cause airflow to pass around the distal end 32 of the door 30 to the rear HVAC portion 20 when in the second position B.

In the third position C, airflow from the rear blower portion 14b is generally entirely directed to the rear HVAC portion 20, and some, but not all, airflow from the front blower portion 14a is also directed to the rear HVAC portion 20. The third position C is generally a rear bias position. Due to a gap or space $X_c$ between the distal end 32 and the evaporator 12, however, airflow from front blower portion 14a will undesirably flow around the door 30 to the front HVAC portion 18. In some instances, the gap $X_c$ can be as large as 10 millimeters. Because the gap $X_c$ is different than each of the gaps $X_a$ and $X_b$, a pressure differential may be created between the front and rear HVAC portions 18 and 20, which may further cause airflow to undesirably pass around the distal end 32 of the door 30 to the front HVAC portion 18 when in the third position C.

Because the gaps $X_a$, $X_b$, and $X_c$ are each different, the distance between the distal end 32 of the door 30 and the evaporator 12 varies depending on whether the door 30 is in first position A, second position B, third position C, or any position therebetween. In order to control airflow leakage from a high pressure side to a low pressure side of the HVAC assembly 10, it would be desirable to keep the distance between the evaporator 12 and the distal end 32 of the door 30 constant as the door 30 rotates between the positions A, B, and C, as well as any position therebetween. It would also be desirable to reduce or eliminate the gap $X_a$-$X_c$ between the evaporator 12 and the distal end 32 of the door 30 to restrict airflow from undesirably passing around the distal end 32, such as when the door 30 is in position B or position C.

SUMMARY

This section provides a general summary of the disclosure, and is not a comprehensive disclosure of its full scope or all of its features.

The present teachings provide for a pivot hub, a main body, and a flexible member. The pivot hub is connectable with a pivot member for pivoting the door assembly. The main body extends from the pivot hub and includes a distal end opposite to and spaced apart from the pivot hub. The flexible member is mounted to, and extends from, the distal end of the main body, and is configured for connection with a guide track. The door assembly is configured for rotation by the pivot member between a first position in which the flexible member is collapsed, and a second position in which the flexible member is extended relative to the first position.

The present teachings further provide for an HVAC airflow door assembly including a pivot hub, a main body, a flexible member, and a guide track. The pivot hub is connectable with a pivot member for pivoting the door assembly. The main body extends from the pivot hub and includes a distal end opposite to and spaced apart from the pivot hub.

The flexible member is mounted to and extends from the main body at the distal end thereof. The flexible member is slidably connected to the guide track. The door assembly is configured for rotation by the pivot member to a first position, a second position, and a third position. In the first position the flexible member is collapsed and the main body extends perpendicular to the guide track. In the second position the main body is rotated relative to the first position, and the flexible member is extended relative to the first position. In the third position the flexible member is rotated relative to the first and second positions, and is extended relative to the first position. The first position is between the second and the third positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
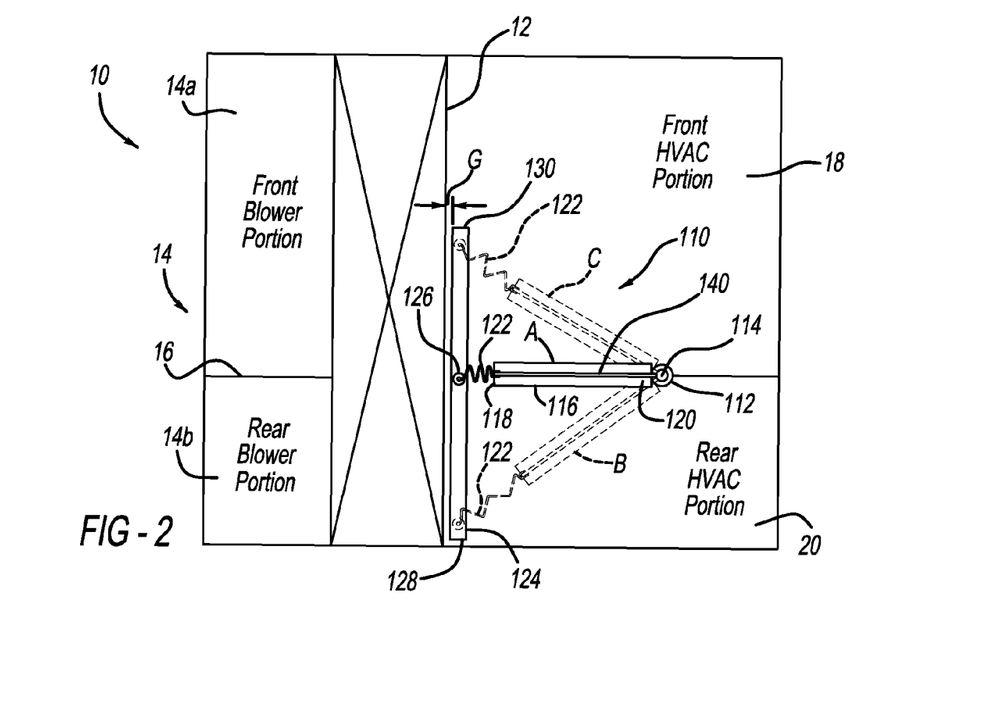
FIG. 2 is a schematic of an HVAC assembly according to the present teachings.

With reference to FIG. 2, a heating, ventilation, and air conditioning (HVAC) airflow door assembly 110 according to the present teachings is illustrated along with the HVAC assembly 10. The HVAC airflow door assembly 110 according to the present teachings generally includes a pivot hub 112 coupled to a pivot member 114. The pivot member 114 is configured to rotate the pivot hub 112 to move the HVAC airflow door assembly 110 to any suitable position, such as position A, position B, position C, or any suitable position between positions B and C. The pivot member 114 can be any suitable pivot member configured for rotation by any suitable device, such as by a servo.

Extending from the pivot hub 112 is a main body 116 of the door assembly 110. The main body 116 extends to a distal end 118 thereof, and includes a proximal end 120, which is at or proximate to the pivot hub 112. The main body 116 and the pivot hub 112 can be separate components coupled together in any suitable manner, or the main body 116 and the pivot hub 112 can be integral with one another.

Extending from the distal end 118 of the main body 116 is a flexible member 122. The flexible member 122 can be any suitable member that is impermeable to airflow, or generally impermeable to airflow, such as any suitable polymer, as described further herein. The flexible member 122 extends to a guide track 124.

The guide track 124 is spaced apart from the evaporator 12 and extends parallel to, or generally parallel to, a length of the evaporator 12. The guide track 124 can be spaced apart from the evaporator 12 at any suitable distance to define a space or gap G between the guide track 124 and the evaporator 12. For example, the gap G can be 5 mm or about 5 mm, such as 4 mm or 6 mm, or any distance between 4 mm and 6 mm.

The flexible member 122 is coupled to the guide track 124 in any suitable manner. For example, the flexible member 122 can be coupled to a slidable member 126 slidably mounted to the guide track 124 such that the slidable member 126 can slide along a length of the guide track 124 to generally any point between a first end 128 and a second end 130 of the guide track 124. The slidable member 126 can be any suitable movable or slidable member, such as a rod, which can be a polymeric rod. The flexible member 122 can be coupled to the slidable member 126 in any suitable manner, such as by overmolding.

Figure 3A:
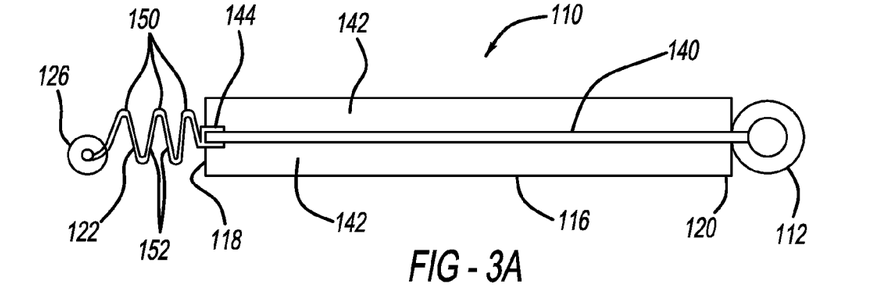
FIG. 3A illustrates an HVAC airflow door assembly according to the present teachings with a flexible member thereof in a compressed configuration.
Figure 3B:
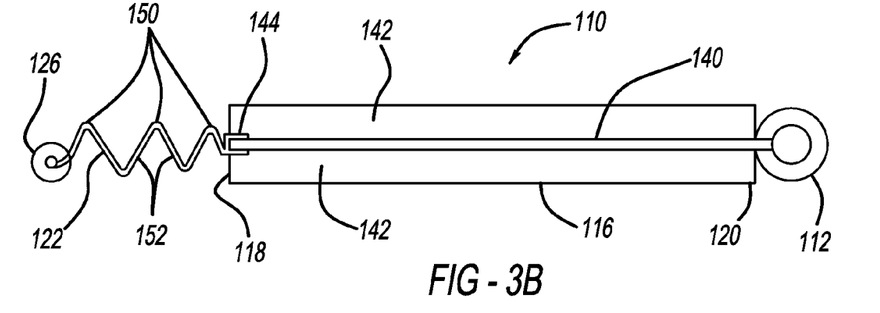
FIG. 3B illustrates the HVAC airflow door assembly of FIG. 3A with the flexible member in an extended configuration.
Figure 3C:
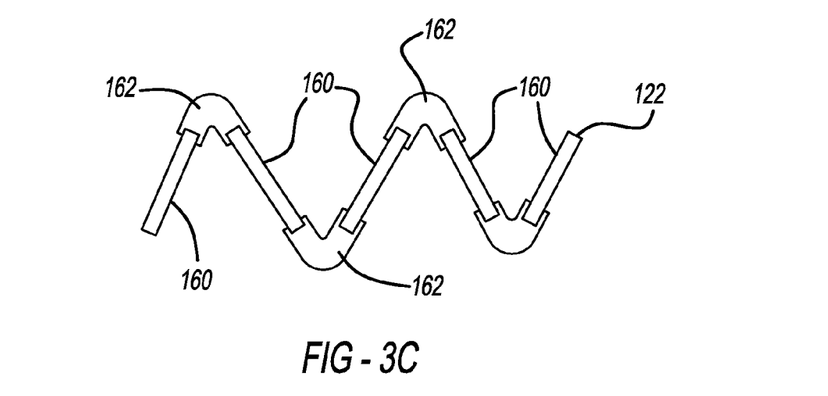
FIG. 3C illustrates another flexible member according to the present teachings.

With reference to FIGS. 3A-3C, additional features of the HVAC airflow door assembly 110 according to the present teachings will now be described. With particular reference to FIGS. 3A and 3B, the door assembly 110 further includes a polymeric member 140 extending along at least a portion of a length of the main body 116 to the distal end 118. The polymeric member 140 can extend across an entire length of the main body 116 from the proximal end 120 to the distal end 118, or across only a portion of a length of the main body 116. The polymeric member 140 is embedded within the main body 116 in any suitable manner. For example, the polymeric member 140 can be embedded within a packing 142 of the main body 116, such as generally sandwiched between portions of the packing 142. The polymeric member 140 can be any suitable polymeric member, such as polypropylene.

The flexible member 122 is coupled to the polymeric member 140 at the distal end 118 of the main body 116 in any suitable manner, such as with an overmold 144. The overmold connection between the polymeric member 140 and the flexible member 122 provides numerous advantages. For example, the overmold provides a spring force to maintain the flexible member 122 in the extended configuration of FIG. 3B, such as when the door assembly 110 is at position B (FIG. 4B) or position C (FIG. 4C), which maintains the door assembly 110 at positions B or C, or any position proximate thereto.

As illustrated in FIGS. 3A and 3B, the flexible member 122 can be made of a continuous elastomeric material extending from the polymeric member 140 to the slidable member 126. The exemplary flexible member 122 of FIGS. 3A and 3B includes a plurality of folded portions 150, between which extend generally linear portions 152. FIG. 3A illustrates the flexible member 122 in a compressed configuration in which the generally linear portions 152 are proximate to one another. FIG. 3B illustrates the flexible member 122 in an extended configuration in which the generally linear portions 152 are angled to extend outward such that the flexible member 122 extends further from the distal end 118 of the main body 116 as compared to the compressed configuration of FIG. 3A.

With additional reference to FIG. 3C, the flexible member 122 can include a plurality of rigid sections 160 connected by flexible joints 162. The rigid sections 160 can be made of any suitably rigid material, such as any suitable polymeric material, such as polypropylene for example. The flexible joint 162 can be made of any suitable material, such as any suitable elastomeric material configured to permit flexing of the rigid sections 160 relative to one another.

Figure 4A:
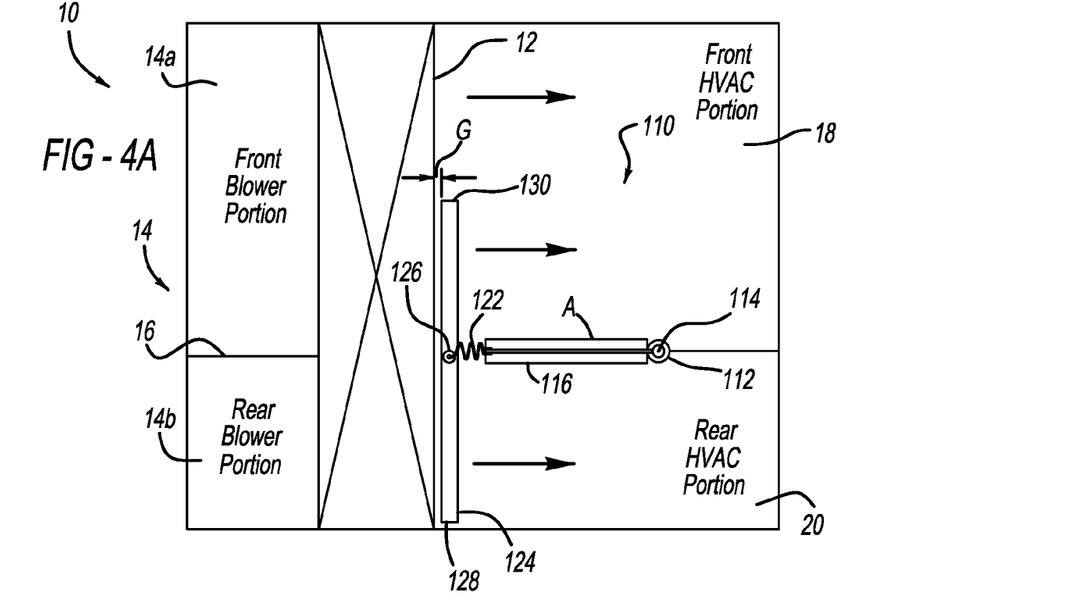
FIG. 4A illustrates the HVAC airflow door assembly according to the present teachings in a first or normal position.
Figure 4B:
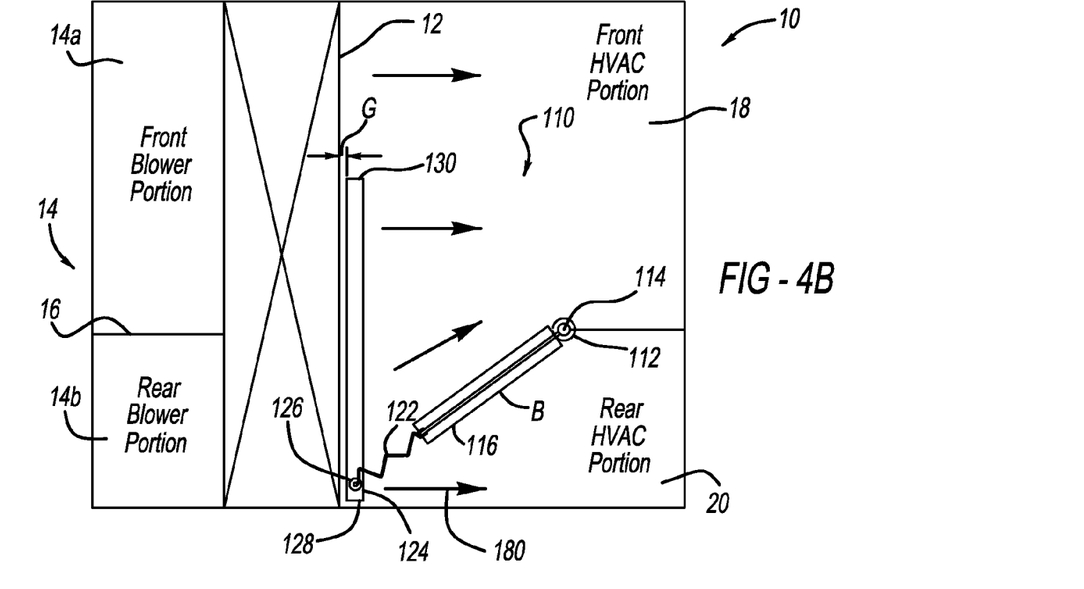
FIG. 4B illustrates the HVAC airflow door assembly according to the present teachings in a second or front bias position.
Figure 4C:
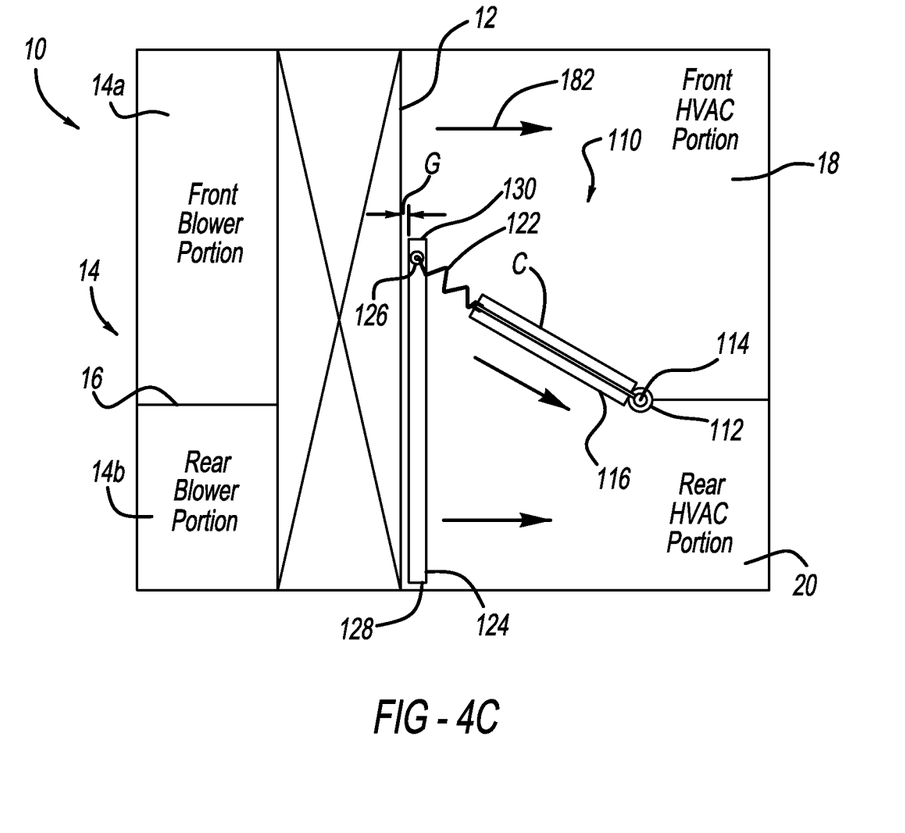
FIG. 4C illustrates the HVAC airflow door assembly according to the present teachings in a third or rear bias position.

With reference to FIGS. 4A-4C, three exemplary positions of the HVAC airflow door assembly 110 are illustrated, and will now be discussed. With initial reference to FIG. 4A, the door assembly 110 is illustrated at position A, which can be a normal position. In position A, the main body 116 extends generally perpendicular to the lengths of both the guide track 124 and the evaporator 12, and is generally aligned with the separator 16 between the front and rear blower portions 14a and 14b. The flexible member 122 is in the compressed configuration, and provides a connection between the distal end 118 of the main body 116 and the guide track 124. Because the flexible member 122 is impermeable to airflow, or generally impermeable to airflow, airflow generally cannot pass from one side of the door assembly 110 to another. For example, because the main body 116 is aligned with the separator 16, airflow from the front blower 14a passing through the evaporator 12 will be exclusively, or nearly exclusively, directed to front HVAC portion 18. Similarly, airflow from the rear blower portion 14b passing through the evaporator 12 will be exclusively, or nearly exclusively, directed to the rear HVAC portion 20.

With reference to FIG. 4B, the door assembly 110 is illustrated in the second position B, which can be a front bias position. In position B, the main body 116 is rotated from position A, and the slidable member 126 is slid along the guide track 124 to the first end 128 or proximate to the first end 128. Because the flexible member 122 is coupled to the slidable member 126, and because the distal end 118 is further from the guide track 124 in the second position B as compared to the first position A, the flexible member 122 is stretched to the extended configuration. The overmold 144 between the polymeric member 140 and the flexible member 122 provides a spring force, which helps maintain the flexible member 122 in the extended position, and thus helps maintain the door assembly 110 in position B until the door assembly 110 is rotated again by the pivot member 114 coupled to the pivot hub 112. Thus, the door assembly 110 is exclusively rotated at the pivot hub 112, and not by the slidable member 126, or example.

With the door assembly 110 in position B, airflow from both the front blower portion 14a and the rear blower portion 14b is directed to the front HVAC portion 18. However, a small amount of airflow 180 may pass from the rear blower 14b around or under (in the exemplary orientation illustrated) the flexible member 122 and the main body 116. Because the flexible member 122 extends to the guide track 124 and is impermeable to airflow (or nearly impermeable to airflow), airflow is unable to pass around the main body 116, such as around the distal end 118 thereof. Airflow is thus primarily directed to the front HVAC portion 18.

FIG. 4C illustrates the door assembly 110 in position C, which can be a rear bias position. In position C, the airflow door assembly 110 is rotated from position A in a direction opposite to position B, and the slidable member 126 extends to, or nearly to, the second end 130 of the guide track 124. In position C, the flexible member 122 again moves to the extended configuration, and is maintained in the extended configuration due to the spring force of the overmold 144 between the polymeric member 140 and the flexible member 122. The door assembly 110 is thus maintained in position C until again rotated by the pivot member 114. In the rear bias position C, airflow from both the front and rear blower portions 14a and 14b is directed to the rear HVAC portion 20, with some airflow (at reference numeral 182 for example) continuing to pass from the front blower portion 14a to the front HVAC portion 18. Airflow is blocked by the flexible member 122, and thus airflow is restricted from passing around the main body 116 at the distal end 118, such as between the distal end 118 and the guide track 124.

Thus with the HVAC airflow door assembly 110 of the present teachings, the flexible member 122 remains at a fixed distance from the evaporator 12, the fixed distance being equal to the distance that the guide track 124 is spaced apart from the evaporator 12 to define gap G. This prevents airflow from passing around the main body 116 at the distal end 118, and prevents airflow from passing or leaking from a high pressure side of the HVAC assembly 10 to a low pressure side thereof.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An HVAC airflow door assembly comprising:
   a pivot hub connectable with a pivot member for pivoting the door assembly;
   a main body extending from the pivot hub, the main body including a distal end opposite to and spaced apart from the pivot hub; and
   a flexible member mounted to and extending from the distal end of the main body, and configured for connection with a guide track, a first end of the flexible member is coupled to the distal end of the main body, and a second end of the flexible member is coupled to a slidable member that slides along a length of the guide track;
   wherein the door assembly is configured for rotation by the pivot member between a first position in which the flexible member is collapsed, and a second position in which the flexible member is extended relative to the first position;
   wherein the flexible member includes a plurality of rigid sections connected by flexible joints configured to permit flexion of the rigid sections relative to one another; and
   wherein the flexible joints and the plurality of rigid sections provide the flexible member with a plurality of folded portions between which extend generally linear portions from the distal end of the main body to the slidable member.

2. The HVAC airflow door assembly of claim 1, wherein in the first position the main body extends perpendicular to the guide track.

3. The HVAC airflow door assembly of claim 1, wherein the flexible member includes an elastomeric material.

4. The HVAC airflow door assembly of claim 1, wherein the flexible member includes a coupling member at a distal end thereof, the coupling member configured to slidably couple with the guide track.

5. The HVAC airflow door assembly of claim 4, wherein when the elastomeric member is coupled to the guide track with the coupling member, movement of the main body from the first position to the second position moves the coupling member along the guide track and away from the distal end of the main body, causing the flexible member to extend relative to the first position.

6. The HVAC airflow door assembly of claim 4, wherein the coupling member is a plastic rod overmolded to the flexible member.

7. The HVAC airflow door assembly of claim 1, wherein the main body includes a polymeric portion and a backing on opposite sides thereof, the polymeric portion extending from a proximal end of the main body at the pivot hub to the distal end, the flexible member is overmolded to the polymeric portion to provide a spring force therebetween and maintain the main body in the second position.

8. The HVAC airflow door assembly of claim 1, wherein the guide track extends entirely across a rear blower portion of a blower and across about half of a front blower portion of the blower, the rear blower portion and the front blower portion are arranged laterally to one another.

9. An HVAC airflow door assembly comprising:
   a pivot hub connectable with a pivot member for pivoting the door assembly;
   a main body extending from the pivot hub, the main body including a distal end opposite to and spaced apart from the pivot hub;
   a flexible member mounted to and extending from the main body at the distal end thereof; and
   a guide track to which the flexible member is slidably connected, a first end of the flexible member is coupled to the distal end of the main body, and a second end of the flexible member is coupled to a slidable member that slides along a length of the guide track;
   wherein the door assembly is configured for rotation by the pivot member to a first position in which the flexible member is collapsed and the main body extends perpendicular to the guide track, a second position in which the main body is rotated relative to the first position and the flexible member is extended relative to the first position, and a third position in which the flexible member is rotated relative to the first and second positions and is extended relative to the first position, the first position is between the second and the third positions;
   wherein the flexible member includes a plurality of rigid sections connected by flexible joints configured to permit flexion of the rigid sections relative to one another; and
   wherein the flexible joints and the plurality of rigid sections provide the flexible member with a plurality of folded portions between which extend generally linear portions from the distal end of the main body to the slidable member.

10. The HVAC airflow door assembly of claim 9, wherein the flexible member is connected with an overmold to the slidable member slidably mounted to the guide track.

11. The HVAC airflow door assembly of claim 9, further comprising a polymeric member extending along a length of the main body, the flexible member overmolded to the polymeric member to provide a spring force configured to bias the flexible member in the extended position.

12. The HVAC airflow door assembly of claim 9, wherein the flexible member is spaced apart from the evaporator at a constant distance in each of the first position, the second position, and the third position.

13. The HVAC airflow door assembly of claim 11, wherein the pivot hub is configured to be mounted on a downstream side of an HVAC evaporator such that the main body is between the pivot hub and the evaporator, and the guide track is between the distal end and the evaporator, such that the guide track is spaced apart from the evaporator at a constant distance along an entire length of the guide track.

14. The HVAC airflow door assembly of claim 9, wherein the guide track extends entirely across a rear blower portion of a blower and across about half of a front blower portion of the blower, the rear blower portion and the front blower portion are arranged laterally to one another.

15. An HVAC airflow door assembly comprising:
- a pivot hub pivotably mounted within an HVAC assembly to a pivot member on a downstream side of an evaporator;
- a main body extending from the pivot hub, the main body including a distal end opposite to and spaced apart from the pivot hub;
- a polymeric member extending along a length of the main body to the distal end;
- a flexible member connected to the polymeric member with an overmold, the flexible member extending from the distal end; and
- a guide track extending parallel to the evaporator between the distal end of the main body and the evaporator, the guide track spaced apart from the evaporator at a constant distance along an entire length of the guide track, the flexible member coupled to a slidable member seated in the guide track that is slidable along the guide track, a first end of the flexible member is coupled to the distal end of the main body, and a second end of the flexible member is coupled to the slidable member that slides along a length of the guide track;

wherein:
- the pivot member is configured to pivot the main body to a first position, a second position, and a third position;
- in the first position the main body extends perpendicular to the guide track and the flexible member is in a collapsed position;
- in the second position the main body is rotated in a first direction relative to the first position and the flexible member is extended relative to the collapsed position of the first position, the overmold between the flexible member and the polymeric member provides a spring force configured to maintain the main body in the second position, in the second position airflow generated by front and rear blowers on a side of the evaporator opposite to the main body is primarily directed to a first portion of the HVAC assembly at a front of a vehicle;
- in the third position the main body is rotated relative to the first position in a second direction opposite to the first direction and the flexible member, is extended relative to the collapsed position of the first position, the overmold between the flexible member and the polymeric member provides a spring force configured to maintain the main body in the third position, in the third position airflow generated by front and rear blowers on a side of the evaporator opposite to the main body is primarily directed to a second portion of the HVAC assembly at a rear of a vehicle;
- the flexible member is spaced apart from the evaporator at a constant distance in each of the first position, the second position, and the third position;
- the flexible member includes a plurality of rigid sections connected by flexible joints configured to permit flexion of the rigid sections relative to one another; and
- the flexible joints and the plurality of rigid sections provide the flexible member with a plurality of folded portions between which extend generally linear portions from the distal end of the main body to the slidable member.

16. The HVAC airflow door assembly of claim 15, wherein the pivot hub is integral with the main body.

17. The HVAC airflow door assembly of claim 15, wherein the guide track is spaced apart from the evaporator by about 5 mm.

18. The HVAC airflow door assembly of claim 15, wherein the guide track is spaced apart from the evaporator by less than 10 mm.

19. The HVAC airflow door assembly of claim 15, wherein the guide track extends entirely across the rear blower and across about half of the front blower, the rear blower and the front blower are arranged laterally to one another.

* * * * *